US007630338B2

(12) United States Patent
Vesterinen et al.

(10) Patent No.: US 7,630,338 B2
(45) Date of Patent: Dec. 8, 2009

(54) TECHNIQUES FOR RADIO LINK RESOURCE MANAGEMENT IN WIRELESS NETWORKS CARRYING PACKET TRAFFIC

(75) Inventors: Seppo Vesterinen, Oulunsalo (FI); Mikko J. Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 645 days.

(21) Appl. No.: 11/403,695

(22) Filed: Apr. 12, 2006

(65) Prior Publication Data

US 2006/0234716 A1 Oct. 19, 2006

Related U.S. Application Data

(60) Provisional application No. 60/671,212, filed on Apr. 13, 2005.

(51) Int. Cl.
*H04W 4/00* (2009.01)
(52) U.S. Cl. .................. 370/329; 370/328; 370/341; 370/395.21; 455/453
(58) Field of Classification Search .......... 370/310, 370/328–347, 352–356; 455/422.1, 424–425, 455/450–453, 509, 517, 560–562.1, 550.1, 455/554.1–555; 709/223, 249
See application file for complete search history.

(56) References Cited

U.S. PATENT DOCUMENTS

| 6,236,646 | B1 | 5/2001 | Beming et al. .............. 370/335 |
| 7,145,889 | B1* | 12/2006 | Zhang et al. ................ 370/329 |
| 7,366,155 | B1* | 4/2008 | Leppisaari et al. .......... 370/348 |
| 2002/0093953 | A1 | 7/2002 | Naim et al. .................. 370/386 |
| 2002/0099854 | A1* | 7/2002 | Jorgensen .................... 709/249 |
| 2004/0102202 | A1 | 5/2004 | Kumaran et al. ............ 455/515 |
| 2004/0158644 | A1* | 8/2004 | Albuquerque et al. ....... 709/238 |
| 2004/0213197 | A1* | 10/2004 | Zimmerman et al. ........ 370/346 |
| 2005/0047360 | A1 | 3/2005 | Love et al. .................. 370/324 |
| 2005/0073953 | A1* | 4/2005 | Kekki .......................... 370/230 |
| 2005/0111462 | A1* | 5/2005 | Walton et al. ............. 370/395.4 |
| 2005/0265301 | A1 | 12/2005 | Heo et al. .................... 370/349 |
| 2006/0062146 | A1 | 3/2006 | Sebire et al. ................ 370/230 |
| 2006/0109829 | A1 | 5/2006 | O'Neil ........................ 370/338 |
| 2006/0120321 | A1* | 6/2006 | Gerkis et al. ................ 370/329 |
| 2006/0198378 | A1* | 9/2006 | Rajahalme .................. 370/328 |

FOREIGN PATENT DOCUMENTS

| EP | 1 635 522 A1 | 3/2006 |
| EP | 1 643 690 A1 | 4/2006 |

* cited by examiner

*Primary Examiner*—Kamran Afshar
(74) *Attorney, Agent, or Firm*—Harrington & Smith, PC

(57) ABSTRACT

A method includes receiving on an uplink communication path one or more packets from a user equipment, and determining radio link resources to be allocated on the uplink communication path for the user equipment. The determination is based at least in part on an information content of the one or more packets. The determined radio link resources are allocated. Another method is disclosed including receiving at a network access element on a first uplink communication path a bandwidth request from a user equipment. The bandwidth request is for a second uplink communication path used for packet traffic from the user equipment to the network access element. Radio link resources to be allocated on the second uplink communication path for the user equipment are determined, the determination is based at least in part on the bandwidth request. The determined radio link resources are allocated on the second uplink communication path.

44 Claims, 11 Drawing Sheets

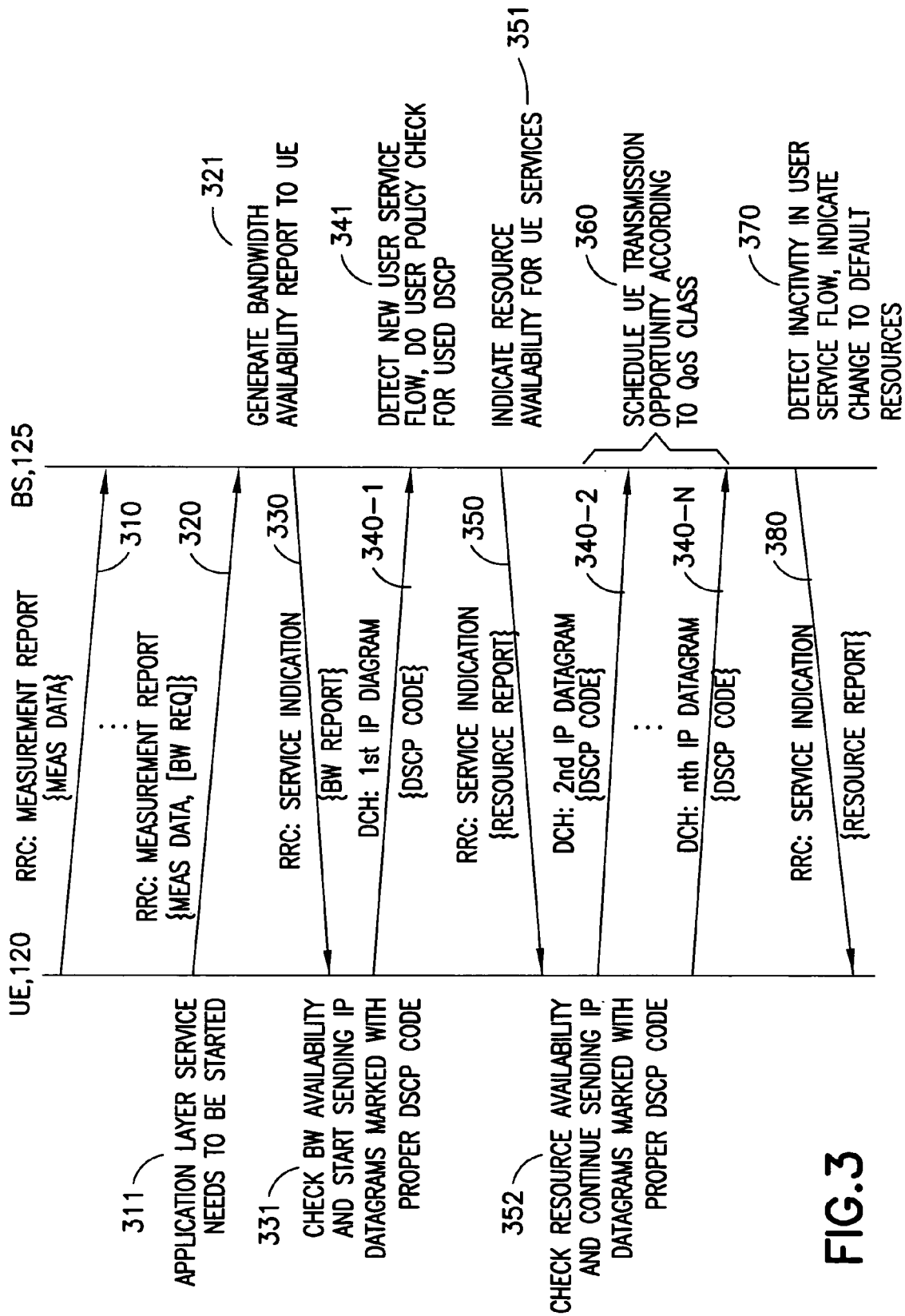

TECHNIQUES FOR RADIO LINK RESOURCE MANAGEMENT IN WIRELESS NETWORKS CARRYING PACKET TRAFFIC

CROSS REFERENCE TO RELATED APPLICATIONS

The present application claims priority under 35 U.S.C. §119(e)(1) to U.S. Provisional Application No. 60/671,212, filed on Apr. 13, 2005, the disclosure of which is hereby incorporated by reference in its entirety.

TECHNICAL FIELD

This invention relates generally to wireless systems and, more specifically, relates to packet traffic in wireless systems.

BACKGROUND

In the current second-generation (2G) and third-generation (3G) cellular systems, radio link resource allocation for user equipment is based on radio bearers that are configured using control signalling. A radio bearer is a service provided by a communication layer (e.g., Layer 2) for the transfer of user data between the user equipment and the wireless network. No user data can be exchanged before the radio bearer has been established. While the radio bearer is in use, changes in radio attributes for the radio bearer (e.g. maximum supported data rate) must be configured using control signalling. Additionally, the radio bearer must be released when it is no longer needed. Depending on the delay requirements of the radio bearer, radio link resources may be permanently allocated during the existence of the radio bearer.

Packet-based services have in present-day cellular systems been implemented "on top of" end-to-end configured bearers. While such bearers are suitable for primarily circuit-switched traffic such as voice, in a packet-based system their significance decreases. This is true because packet-based services are highly dynamic in nature, as opposed to being continuous. In the context of packet-based services, a pre-established radio bearer that reserves certain radio link resources only for one user will waste overall network resources, if the reserved radio link resources are not continuously in efficient use.

Also, radio bearer establishment signalling in the beginning of a connection between the user equipment and the network increases perceived latency for packet-based services. In general, radio bearer management in a wireless network increases the complexity of the network at system level. This problem has been identified, e.g., in the third generation partnership project (3GPP), where shorter set-up latency has been requested by many vendors and operators.

Thus improvements could be made to wireless networks carrying packet traffic.

BRIEF SUMMARY

In an exemplary embodiment, a method includes receiving on an uplink communication path one or more packets from a user equipment. The method further includes, responsive to the reception, determining radio link resources to be allocated on the uplink communication path for the user equipment. The determination is based at least in part on an information content of the one or more packets. The method also includes allocating the determined radio link resources on the uplink communication path for the user equipment.

In another exemplary embodiment, an apparatus includes circuitry configured to receive on an uplink communication path one or more packets from a user equipment. The circuitry is configured, responsive to the reception, to determine radio link resources to be allocated on the uplink communication path for the user equipment. The determination is based at least in part on an information content of the one or more packets. The circuitry is configured to allocate the determined radio link resources on the uplink communication path for the user equipment.

In a further exemplary embodiment, a signal bearing medium is disclosed that tangibly embodies a program of machine-readable instructions executable by at least one processor to perform operations. The operations include receiving on an uplink communication path one or more packets from a user equipment. The operations also include, responsive to the reception, determining radio link resources to be allocated on the uplink communication path for the user equipment. The determination is based at least in part on an information content of the one or more packets. The operations additionally include allocating the determined radio link resources on the uplink communication path for the user equipment.

In an additional exemplary embodiment, an apparatus is disclosed that includes means for receiving on an uplink communication path one or more packets from a user equipment and means, responsive to the reception, for determining radio link resources to be allocated on the uplink communication path for the user equipment. The determination is based at least in part on an information content of the one or more packets. The apparatus also includes means for allocating the determined radio link resources on the uplink communication path for the user equipment.

In a further exemplary embodiment, a method is disclosed including receiving at a network access element on a first uplink communication path a bandwidth request from a user equipment. The bandwidth request is for a second uplink communication path used for packet traffic from the user equipment to the network access element. The method further includes, responsive to the reception, determining radio link resources to be allocated on the second uplink communication path for the user equipment. The determination is based at least in part on the bandwidth request. The method also includes allocating the determined radio link resources on the second uplink communication path for the user equipment.

BRIEF DESCRIPTION OF THE DRAWINGS

The foregoing and other examples of this invention are made more evident in the following Detailed Description, when read in conjunction with the attached Drawing Figures, wherein:

FIG. 3 is a signalling flow chart of dynamic user service flow activation and termination;

FIG. 4 includes FIGS. 4A and 4B, where FIG. 5 includes FIGS. 5A and 5B, where

DETAILED DESCRIPTION

As explained above, the use of radio bearers to provide packet-based services can be inefficient, increasing perceived latency and complexity of the wireless network. Thus in radio access networks carrying packet traffic, dynamic sharing of radio link resources between multiple users should be optimized as far as possible so that all traffic capacity is used more efficiently and latencies due to heavy signalling can be reduced.

In the context of wireless networks such as the planned, packet-optimized long-term evolution of 3G radio access networks, it would be better to define improved means for radio resource control, thereby enabling more efficient dynamic sharing of radio resources between multiple users at the same time reducing latencies due to heavy signalling. As most of the quality of service information is relevant only to the transmitting entity, radio bearers with end-to-end setup signalling prior to the connection can be replaced in between the user equipment (UE) and the network (e.g., BS) with a local link layer service in the transmitting node. The service interface to the upper layers (e.g., L3 and above) may appear identical to a system based on end-to-end bearer establishments, but a system based on the present invention preferably is capable of starting service based on default connection parameters and without prior end-to-end signalling between peer entities. In this case all necessary functional entities and data paths needed for transporting individual data flows over the radio link would preferably be dynamically established during the connection. Radio resource management (RRM) enabled by this type of radio resource control is, for the purposes of this document, henceforth referred to as "bearerless RRM". Examples of bearerless RRMs are described in more detail herein.

An exemplary bearerless RRM concept disclosed herein can be considered a marked change in the radio interface, as the bearerless RRM concept is typically applied only in the context where the radio link traffic channel is allocated as a shared medium. However, said bearerless RRM does not in any way restrict the transport method applied on the radio interface, and allows data to be carried also over common or dedicated channels. The proposed method gives an opportunity to simplify the required control functions significantly. Prior to describing steps taken to enable exemplary "bearerless RRM," Applicants will describe an exemplary radio access network 100 for implementing the disclosed invention.

Figure 1:
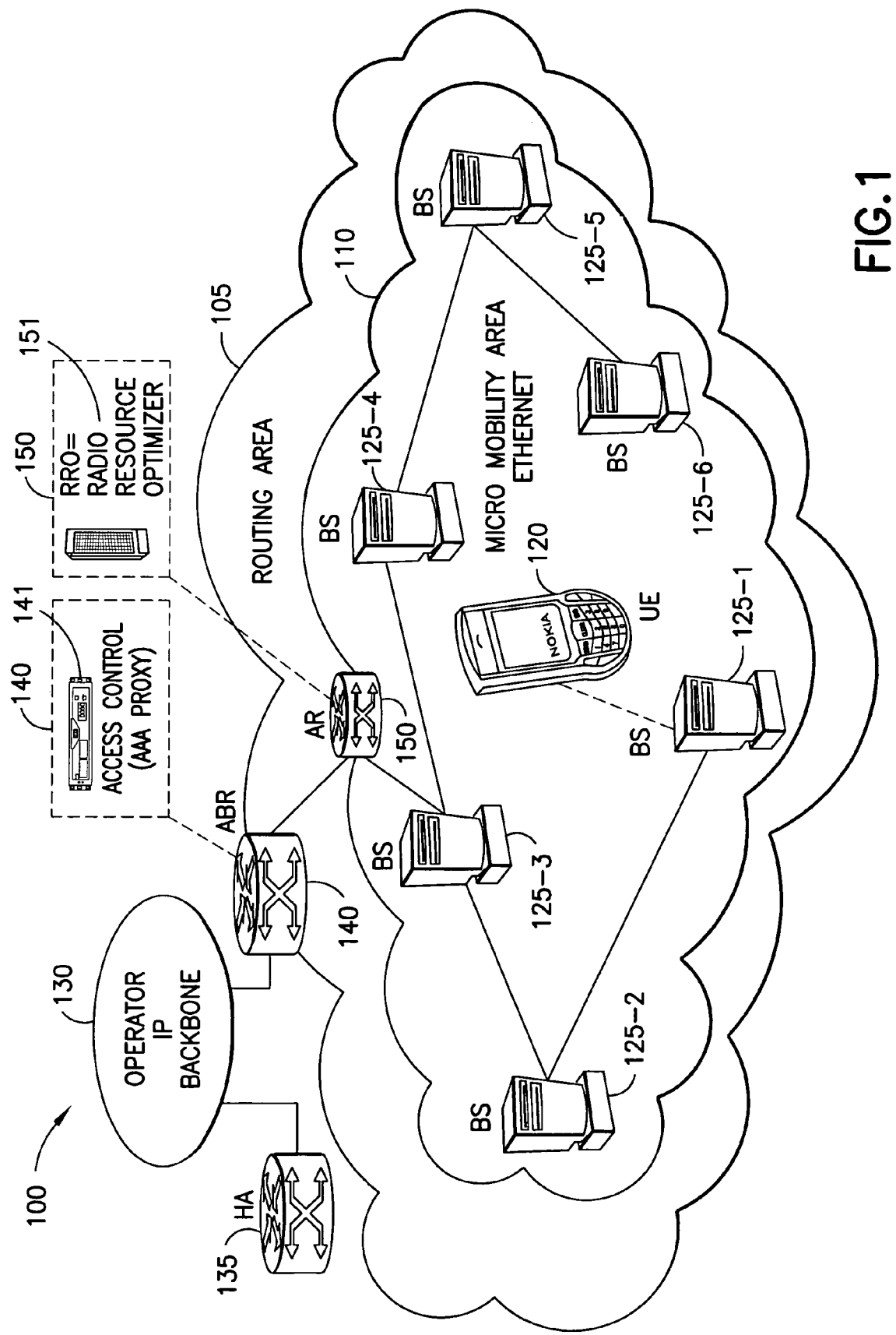
FIG. 1 is a block diagram of an exemplary radio access network in accordance with an exemplary embodiment of the invention.

Turning now to FIG. 1, an exemplary radio access network 100 is shown. Exemplary radio access network 100 comprises a home agent (HA) 135 that communicates with an operator Internet Protocol (IP) backbone 130, the operator IP backbone 130, an area border router (ABR) 140 that enables communication between a routing area 105 and the area border router 140, and the routing area 105. The routing area 105 is assumed in an exemplary embodiment to be a DiffServ domain where base stations 125 and area border routers 140 are the edge nodes. The routing area 105 comprises one or more access routers (AR) 150 that enable communication between the area border router 140 and the micro mobility area(s) Ethernet 110. The micro mobility area Ethernet 110 comprises base station 125-1 through base station 125-6. In this example, user equipment 120 is communicating with base station 125-1, which is a network access element providing access to a number of circuit-switched and packet-switched networks. Although not shown in FIG. 1, each base station 125 typically serves one or more "cells" of the radio access network 100.

In the example of FIG. 1, the area border router 140 comprises access control 141, also called an Access, Authorization, and Accounting (AAA) proxy. The access router 150 comprises a radio resource optimizer (RRO) 151. The base station 125 provides a layer two (L2) interface, e.g., Ethernet to the packet switched access network. The base station 125 is a function within the radio access network 100 that provides a physical radio link between the user equipment 120 and the base station 125. The home agent 135, area border router 140, access router 150, and much of the base station 125 and user equipment 120 are known to those skilled in the art. It should be noted that a base station 125 can be coupled to an L2 switch, and may include a simple direct Ethernet interface, an integrated L2 switch, or an integrated IP router function. Additionally, the base station 125 can include or be an access point. There could be multiple micro mobility areas Ethernet 110, each of which could be coupled to one or more access routers 150.

Figure 2A:
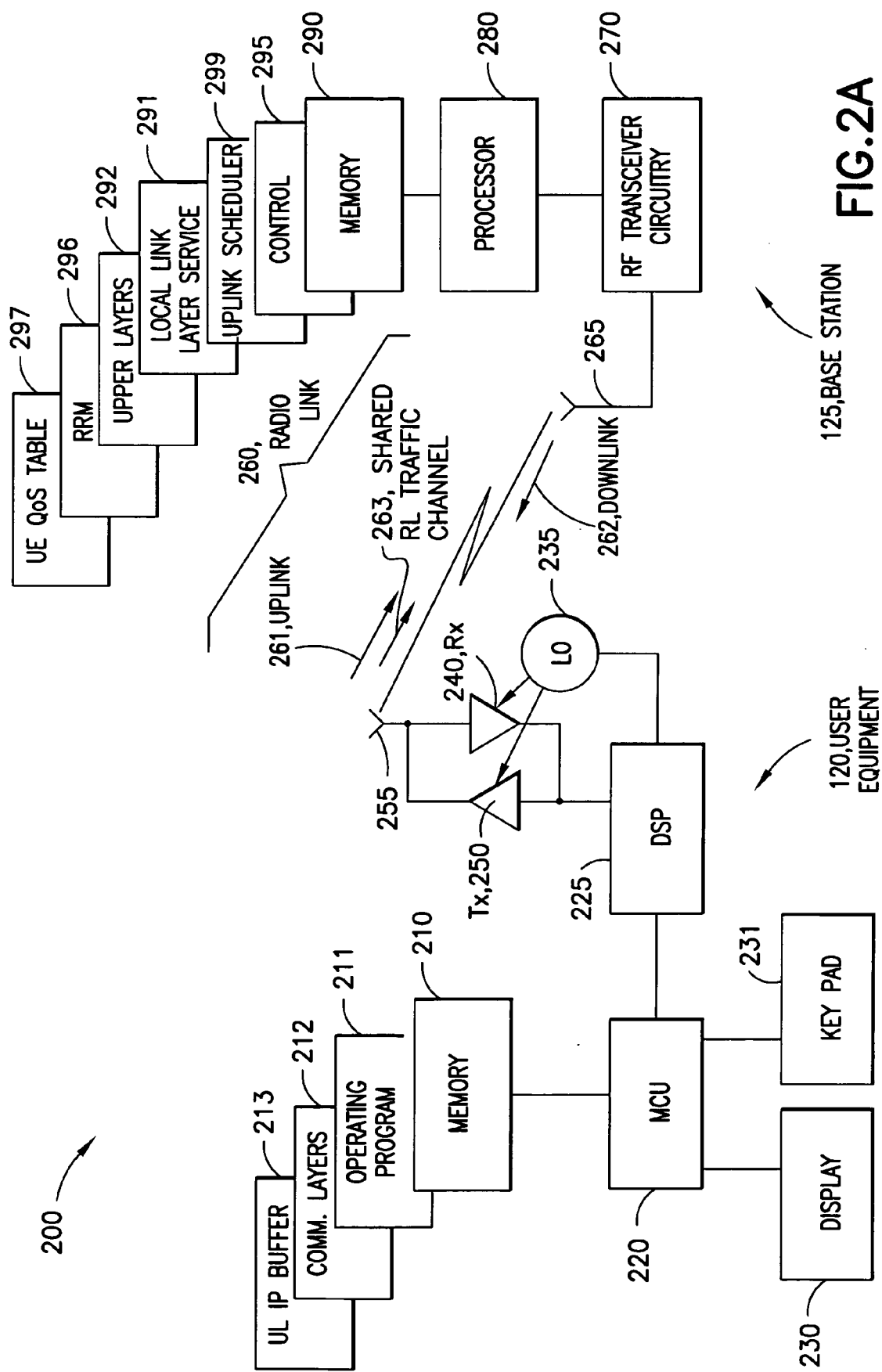
FIGS. 2A and 2B are block diagrams of a portion of the radio access network of FIG. 1.

Turning now to FIG. 2A, there is shown a simplified block diagram of an embodiment of a portion 200 of the radio access network 100 of FIG. 1. The portion 200 includes user equipment 120 and a base station 125. A radio link 260 exists between the user equipment 120 and the base station 125 that transmit in a downlink (e.g., forward) direction both physical and logical channels to the user equipment 120 in accordance with a predetermined air interface standard. Thus, a downlink communication path 262 exists at certain times on the radio link 260. An uplink (e.g., reverse) communication path 261 also exists at certain times on the radio link 260 from the user equipment 120 to the base station 125. The uplink communication path 261 conveys, e.g., mobile originated access requests and traffic. On the uplink communication path 261 there are also shared radio link traffic channels 263, which are used instead of dedicated channels, which traditionally have more persistent allocations. The shared radio link traffic channel 263 is shared amongst multiple user equipments 120 such that transmission by a given user equipment 120 is in an exemplary embodiment dynamically allocated on the shared radio link traffic channel 263. In an exemplary embodiment, transmission by a given user equipment 120 using the shared radio link traffic channel 263 is controlled based on packet-based traffic from the given user equipment 120 and typically quality of service (QoS) associated with the given user equipment 120 and capacity (e.g., the amount of unused capacity) of the shared radio link traffic channel 263.

One or more cells (not shown) are associated with each base station 125, where one cell will be considered at any given time to be a serving cell, while an adjacent cell(s) will be considered to be a neighbor cell. Smaller cells (e.g., pico-cells) may also be available.

The air interface standard can conform to any suitable standard or protocol optimized for packet switched data traffic, such as data traffic enabling Internet access and web page downloads. In an exemplary embodiment of this invention, the air interface standard is compatible with packet switched air interface standards, such as 3G Long-Term Evolution or fourth generation (4G), although this is not a limitation upon the practice of this invention. It should be noted that packet traffic could be communicated using traffic channels (TCH) such as either dedicated channels (DCH) or shared channels (ShCH). Further, where internet protocol (IP) control messages would be transferred over links on control channels, control channels (CCH) could be used.

The user equipment 120 typically includes a control unit, such as a microcontrol unit (MCU) 220 having an output coupled to an input of a display 230 and an input coupled to an output of an input device such as keypad 231. The user equipment 120 may be a handheld radiotelephone, such as a cellular telephone or a personal communicator. The user equipment 120 is typically a combination of a mobile station and a subscriber identity module (SIM), although any device suitable for communicating over a radio link 260 may be used. The user equipment 120 could also be contained within a card or module that is connected during use to another device. For example, the user equipment 120 could be contained within a personal computer memory card international association (PCMCIA) or similar type of card or module that is installed during use within a portable data processor, such as a laptop or notebook computer, or even a computer that is wearable by the user.

In general, the various embodiments of the user equipment 120 can include, but are not limited to, cellular telephones, personal digital assistants (PDAs), portable computers, image capture devices such as digital cameras, gaming devices, music storage and playback appliances, Internet appliances permitting Internet access and browsing, as well as portable units or terminals that incorporate combinations of such functions.

The MCU 220 is assumed to include or be coupled to some type of a memory 210, typically including a non-volatile memory for storing an operating program and other information, as well as a volatile memory for temporarily storing required data, scratchpad memory, received packet data, packet data to be transmitted, and the like. Memory 210 includes in this example an operating program 211, communication layers 212, and an uplink (UL) internet protocol (IP) buffer 213. The operating program 211 is assumed to enable the MCU 220 to execute the software routines (not shown), communication layers 212 and protocols (not shown) required to implement the methods in accordance with this invention, as well as to provide a suitable user interface (UI), via display 230 and keypad 231, with a user. As used herein, "user" and "user equipment" will be used interchangeably, although it should be pointed out that the user and his or her associated user equipment 120 are different entities. Although not shown, a microphone and speaker are typically provided for enabling the user to conduct voice calls in a conventional manner. The UL IP buffer 213 is used by the UE 120 in order to determine how much bandwidth to request from the base station 125, as described below.

The user equipment 120 also contains a wireless section that includes a digital signal processor (DSP) 225, or equivalent high speed processor or logic, as well as a wireless transceiver that includes a transmitter 250 and a receiver 240, both of which are coupled to an antenna 255 for communication with the base station 125. At least one local oscillator, such as a local oscillator 235, is provided for tuning the transceiver. Data, such as digitized voice and packet data, is transmitted and received through the antenna 240.

The base station 125 includes RF transceiver circuitry 270, a processor 280, and a memory 290. The memory includes a control module 295, an uplink scheduler 299, a local link layer service 291, upper communication layers 292, a radio resource management (RRM) module 296, and an UE QoS table 297. The control module 295 is a module that controls functions of the base station 125 to carry out embodiments of the disclosed invention. The functions of the control module 295 may be built into other parts of the base station 125, including parts not shown. The uplink scheduler 299 allocates transmission opportunity to a given user equipment 120 according to the packet traffic of the given user equipment 120 instead of reserving a fixed bandwidth per given user equipment 120. The uplink scheduler 299 may also consider QoS for the given user equipment 120 when providing the user equipment 120 transmission opportunity. The local link layer service 291 provides to the upper communication layers 292 (e.g., L3 and above) the interface to request the establishment of new QoS profiles based on current need. The local link layer service 291 is used to interface with the downlink communication path 261. The local link layer service 291 acts to replace the radio bearers as a service interface indicated to the upper layer. Because the local link layer service 291 acts to replace radio bearers, the UE 120 need not, and in an exemplary embodiment herein does not, support radio bearer related control (e.g., radio bearer setup, radio bearer modification, or radio bearer deletion).

The RRM module 296 has knowledge of radio link resources. The control module 295 and the RRM module 296 interact to provide appropriate radio link resources to active user service flows. A user service flow is one or more messages having packets. User service flows can be differentiated, for IP flows, based on a "5-tuple" including source IP address, destination IP Address, transport protocol (e.g., TCP and UDP), source port, destination port. In addition to this, Internet Protocol version six (IPv6) specifies an optional flow ID in the IP header of an IP packet. The control module 295 can determine, as explained in more detail below, which user equipments 120 have a corresponding active user service flow and appropriate quality of service (QoS) for the active user service flows. The UE QoS table 297 is used to store which user equipments 120 have active user service flows and appropriate QoS corresponding to those active user service flows.

The antenna 265 is generally a multiple-input, multiple-output antenna (MIMO), but any antenna may be used. The processor 280 and memory 290 may be singular or distributed.

Figures 1, 2B:
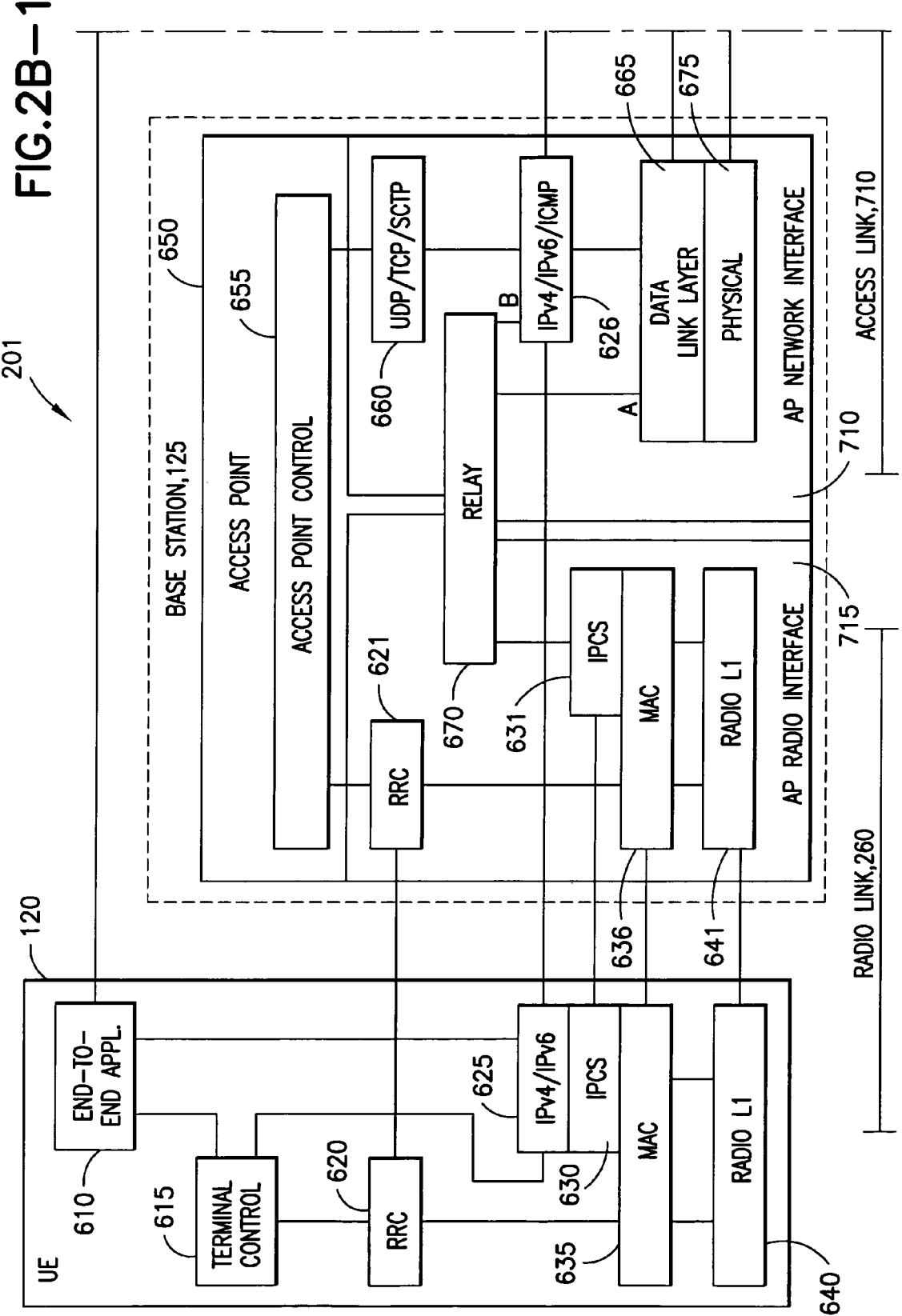

Referring now to FIG. 2B, a portion 201 of the radio access network 100 is shown. Portion 201 comprises user equipment 120 in communication with a base station 125 and a correspondent node 651. The base station 125 is shown in communication with an access router 150. The user equipment 120 in this example comprises an end-to-end application 610, a terminal control module 675, a radio resource control (RRC) module 620, an IPv4/IPv6 module 625 wherein IPv4 is the fourth version of the internet protocol, an IP convergence sublayer (IPCS) module 630, a media access control (MAC) module 635, and a radio L1 module 640. The base station 125 comprises access point 650, which comprises an access point control module 655, an AP radio interface 715, and AP network interface 720, and a relay module 670, which provides coupling between the AP radio interface 715 and the AP network interface 720. The AP radio interface 715 comprises a RRC module 621, an IPCS module 631, a MAC module 636, and a radio L1 module 641. The AP network interface 720 comprises a protocol module 660 supporting user datagram protocol (UDP), transmission control protocol (TCP), and stream control transmission protocol (SCTP), an IPv4/IPv6/ICMP module 626 where ICMP stands for internet control message protocol, a data link layer module 665, and a physical layer module 675.

The access router 150 comprises an access router control module 690, a protocol module 691 supporting UDP, TCP, and SCTP, an IPv4/IPv6/ICMP module 629, an IP routing and forwarding module 627, two data link layer modules 669 and 667, and two physical layer modules 676 and 677. The correspondent node 651 comprises an end-to-end application 611, an IPv4/IPv6 module 628, a data link layer module 668, and a physical layer module 678.

In the example of FIG. 2B, the operating program 211 of FIG. 2A comprises the terminal control module 675. The communication layers 212 of FIG. 2A comprise the IPv4/IPv6 module 625, the IPCS module 630, the MAC module 635, and the radio L1 module 640. The control module 295 comprises the access point control module 655. The radio resource management (RRM) module 296 comprises the RRC module 621, and the RRC module 621 implements the uplink scheduler 299 and the UE QoS table 297. The upper communication layers 292 comprise the IPCS module 631 and the MAC module 636. The radio L1 module 641 implements the local link layer service 291. The access point 650 and the access router 150 communicate using access link 710.

The user equipment 120 starts an application layer service flow when the end-to-end application 610 is started. The end-to-end application 610 could be, e.g., an Internet browser using hypertext transmission protocol (HTTP) or file transfer protocol (FTP) or a voice over internet protocol (VoIP) application. The end-to-end application 611 in the correspondent node 651 would then be an application that serves Internet pages, files, or voice, respectively, to the user equipment 120. The radio L1 modules 640, 641 then provide the underlying radio link layer service (e.g., local link layer service 291) that provides packet data transport mechanisms over the radio link 260.

Modules 625, 626, 627, and 628 implement functionalities to allow packet communication using IP. Modules 665, 669, 667, and 668 provide data link layer functionalities, and modules 675, 676, 677, and 678 provide physical layer functionalities.

It should be noted that in FIG. 2B, an access network includes the access point 650, the access router 150, and the correspondent node 651. Additionally, an L2 switch 127 could be located in FIG. 2B between the access point 650 and the access router 150.

The blocks in user equipment 120 and base station 125 may be implemented through circuits such as processors executing software, hardware such as semiconductor circuits, individual logic elements coupled to other logic elements, programmable logic devices, or some combination of these. The blocks in user equipment 120 and base station 125 may be combined or further subdivided. The disclosed invention may be implemented on a signal bearing medium tangibly embodying a program of machine-readable instructions executable by a circuit to perform operations suitable for carrying out one or more techniques presented herein.

Now that exemplary radio access networks have been described, certain ideas useful for detailing the disclosed invention will be described. These notions will be described in reference to FIG. 3, which shows an exemplary signalling flow chart of dynamic user service flow and activation. The first notion to be described concerns user service flow initiation.

An important principle in the concept of a bearerless RRM is that whenever the user equipment 120 is associated to a cell, the user equipment 120 will in an exemplary embodiment have permission to directly access the cell (e.g., shared radio link traffic channel 263) for user IP traffic. In a lightly loaded network, it can be assumed that the required radio link resources are available for the user service. Latency for starting an application layer service flow should become minimal.

One technique for providing user service flow initiation is through dynamic admission control. If the user equipment 120 is permitted to access a high-rate channel for user IP traffic so that the access happens in a non-controlled manner, the non-controlled manner will cause a problem of network overloading in the case when too many concurrent users share limited network resources such as radio link resources. Thus, the radio access network 100 should provide dynamic admission control that works with minimal signalling on the radio resource control (RRC) protocol. The user equipment 120 may retrieve the required bandwidth availability report by using a probing message to the base station 125, by receiving the bandwidth availability report periodically from the base station 125, or through other techniques.

In an exemplary embodiment, it is assumed that user equipment 120 operating in accordance with evolved 3G is capable of sending periodic measurement reports to the base station 125, as the user equipment 120 is able to do in current cellular systems. A conventional message is shown in step 310, where the "Measurement Report" message is sent using an RRC protocol. The message includes the measurement data, {Meas Data}. In exemplary embodiment of the disclosed invention, when the user equipment 120 desires to start a new application layer service (e.g., by starting end-to-end application 610 of FIG. 2B), as shown in step 311, the user equipment 120 includes a bandwidth request into the "Measurement Report" message in order to simplify signalling (e.g., no need for a dedicated message for this purpose). This is shown in step 320, where the "Measurement Report" message is sent using an RRC protocol and includes both measurement data and a bandwidth request, {Meas Data, [BW Req]}. In an exemplary embodiment, the bandwidth request, "BW Req", is determined by the UE 120 accessing a buffer (e.g., UL IP buffer 213 in FIG. 1) to examine how much information (e.g., typically as packets) is ready for transmission. Thus, the bandwidth request could indicate as an example 100 kilobits (kb) or 100 kilobits per second (kbs) (e.g., based on the number of packets accumulating over a predetermined time period).

In an exemplary embodiment, the base station 125 generates a bandwidth availability report (step 321) and replies with a "Service Indication" message using an RRC protocol. The "Service Indication" message contains the bandwidth availability report (e.g., information about available bandwidth, {BW Report}), as shown in step 330. The base station 125 can determine the bandwidth availability report at least in part by using the BW Req from the UE 120.

An exemplary alternative method to step 330 would be to use, e.g., a "System Information" message to deliver the available bandwidth in a cell to all associated user equipments 120. In this alternative method, the available bandwidth would be available automatically without issuing an explicit request message for the available bandwidth.

In order to implement dynamic admission control, the user equipment 120 may check the bandwidth availability information in the "BW Report" received in step 330, and may use that information as admission control from the base station 125 in case the required resources for initiating a user service flow are not available at the time. This occurs in step 331. Using the "BW Report" information, the user equipment 120 can modify its actions accordingly, such as delaying sending IP datagrams (i.e., IP packets) based on a low available bandwidth, sending infrequent IP datagrams, or not starting the end-to-end application 610 until a "BW Report" is received with a higher available bandwidth, or some combination of these.

However, in spite of the current (e.g., low resource) network resource situation, the user equipment 120 should be allowed to send IP datagrams at any moment the base station 125 provides uplink transmission opportunity to the user equipment 120. This is important for enabling best effort traffic at any situation.

Another notion to be considered is providing quality of service (QoS) in radio links. Permission given to the user equipment 120 to send IP datagrams at any moment can be reasoned also with service flows requiring better QoS than best effort traffic. This can be based on the assumption that the network loading may change rapidly in packet-based services due to bursty nature of IP traffic. In an exemplary embodiment, the base station 125 could be capable of offering more transmission opportunities to the user equipments 120 that are detected as being active in their respective user service flows. This means that the base station 125 should be able to re-allocate radio link resources quickly and automatically from non-active user service flows to the active users and their associated user service flows.

The radio access network 100, which could be an evolved 3G network, is assumed in an exemplary embodiment to support policy-based QoS based on differentiated services (DiffServ). Also, the radio interface should be capable in this exemplary embodiment of differentiating IP traffic based on differentiated services code point (DSCP) codes. As is known in the art, a DSCP code in the header of an IP packet is used to prompt network routers to apply differentiated grades of service to various packet streams.

It is assumed, in an exemplary embodiment, that the base station 125 provides Policy Enforcement Point (PEP) in uplink, as the base station 125 will be the edge node to the access network domain that works according to pre-configured network level DiffServ policies. Also it is assumed that the base station 125 has available user-specific QoS policies, typically from user subscription information. How the base station 125 receives or retrieves the QoS policies is out of scope of this document, but is apparent to those skilled in the art.

In downlink, the base station 125 schedules in an exemplary embodiment all packet traffic of user equipments 120 to a shared link, as any DiffServ capable access router could do, except now the physical link is wireless (e.g., a radio link is used). The shared link is a radio link traffic channel, shown in FIG. 2A as shared radio link traffic channel 263. The shared radio link traffic channel 263 in an exemplary embodiment will be based on a new packet traffic optimized radio interface, e.g. for evolved 3G. In case there will be congestion, the base station 125 in an exemplary embodiment begins to drop packets that have lower priority DSCP markings.

The PEP in downlink will typically be at an edge node to the access network or close to the correspondent node (e.g., correspondent node 651 of FIG. 2B). The access network, described above in reference to FIG. 2B, is a packet switched transport network using copper, optical or Micro Wave links at the L1, physical, layer. The access network could also be an L2 switched (e.g., Metro Ethernet) or IP routed network. A correspondent node (e.g., correspondent node 651) is a peer node with which the user equipment 120 is communicating. A peer node is, e.g., another user equipment 120, a Web Server, etc. An edge node is part of the DiffServ architecture. The edge node provides per-flow traffic management and marks packets as in-profile and out-profile. An edge node is located at a DiffServ-capable host or a DiffServ-capable router. Edge node functionality is assumed to happen both in the user equipment 120 (e.g., as host) and the base station 125. The user equipment 120 will "pre-mark" packets with DSCP code(s) and the base station 125 performs a policy check and may "re-mark" packets before forwarding to the access network, now a DiffServ domain. The edge node marks packets according to classification rules to be specified (manually by admin, or by some protocol). The edge node may delay and then forward packets or may discard packets based on the classification rules.

It should be noted that DiffServ is one technique for providing QoS for packet-based services. However, the disclosed invention may use other techniques for providing QoS. Furthermore, embodiments of the disclosed invention may operate without QoS, such as operating on a first-come, first-served basis, where the shared radio link traffic channel 263 and radio link resources therefore are given to those user equipments 120 that initiate user service flows prior to initiation of user service flows by other user equipments 120.

How QoS setup will be utilized in the far end application server (not shown) is out of scope of this document, as the QoS setup will be issued between the user equipment 120 and far end application server or correspondent node (e.g., another user equipment 120), and such QoS setup is known to those skilled in the art.

In case the user equipment 120 will need more radio link resources (e.g., better QoS) for a new user service flow in uplink, the user equipment 120 is assumed to be capable of marking transmitted IP datagrams with the desired QoS Class (e.g., using DSCP codes for DiffServ) accordingly. This occurs, for instance, in step 340-1, where the user equipment 120 sends an "IP Datagram" message using a traffic channel (TCH), e.g., a dedicated channel (DCH), where the "IP Datagram" message comprises the DSCP code. It should be noted that IP datagrams could also be sent using a control channel (CCH).

Another notion to be described is dynamic detection of a new user service flow with QoS. In an exemplary embodiment, the base station 125 is capable of detecting, e.g., automatically, a new user service flow from the first IP datagram as the base station 125 is assumed to make IP lookups packet-by-packet.

This procedure includes a policy check for the determined QoS class for the particular user service flow for a user equipment 120 and when permitted the base station 125 stores a 5-tuple (e.g., an IP header comprising a source address, destination address, source port, destination port, and the protocol used for IP) of the user service flow and marks the 5-tuple active automatically (e.g., automatic learning). Thus, in step 341, the base station 125 determines that a user service flow has begun, stores the 5-tuple, and marks the 5-tuple as active. The base station 125 has in an exemplary embodiment the capability to learn (e.g., through DSCP codes or other content information) the uplink QoS from the first transmitted IP packet (step 341) and apply this information in allocating radio link resources for the uplink. The base station 125 may also use higher layer content information from the IP packet, e.g., real-time transport protocol (RTP), trivial file transfer protocol (TFTP), file transport protocol (FTP), or hypertext transport protocol (HTTP) in order to determine what traffic profile could be applied for providing proper QoS for this user service flow. The traffic profile may indicate behavior of the used transport protocol (e.g., RTP, TFTP, FTP, or HTTP) that could be taken into account when scheduling uplink transmission opportunities. For example, the base station 125 could predict, based on the used transport protocol, periods when a burst of packet transmission occurs or may occur from the user equipment 120. Using the RTP typically indicates that a real-time stream of data is to be transmitted by the user equipment 120, and a real-time stream may be less bursty than a stream created using the HTTP. The base station 125 in an exemplary embodiment determines and allocates radio link resources for the scheduled uplink transmission opportunities.

Whenever a new user service flow is detected, the base station 125 in an exemplary embodiment sends a "Service Indication" message that indicates the current uplink transmission opportunities to user equipment 120. This is shown in step 350. The "Service Indication" message may indicate increase or not of uplink transmission opportunities, depending on the available radio link resources such as available bandwidth in the shared radio link traffic channel 263. This provides means for efficient uplink rate limiting in the base station 125 in the case where no more network radio link resources can be provided (e.g., as would occur in a highly loaded network). In a highly loaded network, it can be assumed that the required radio link resources are not available for providing enough bandwidth to the user service flow (e.g., such that breaks are caused in a VoIP call or slow file transfer results).

In step 352, the user equipment 120 checks resource availability, using the "Service Indication" message (e.g., the {Resource Report} in the "Service Indication" message) and will continue to send the IP datagrams marked with proper DSCP code. Note that the user equipment 120 can modify its actions according to the resource availability, such as delaying sending IP datagrams based on a low available bandwidth, sending infrequent IP datagrams, or terminating the end-to-end application 610 until a "Service Indication" message is received indicating a higher available bandwidth. In other words, the user equipment 120 attempts to meet the allocated radio link resources.

Once the user service flow begins, the base station 125 tries to provide sufficient QoS to the detected user service flow (step 360). In an exemplary embodiment, the base station 125 shall schedule an uplink transmission opportunity for every associated user equipment 120. This schedule will be adjusted according to user activity and bandwidth needed for user service flow(s) that are detected automatically. It should be noted that the scheduled uplink transmission opportunity can be used to determine and allocate radio link resources on the uplink communication path 162. The base station 125 will control only its own radio link resources (e.g., distributed RRM). However there could be a centralized radio resource manager function in the network if needed. The detected user service flow in the example of FIG. 3 includes steps 340-1 through 340-N. In order to provide sufficient QoS, the base station 125 uses the QoS that was learned automatically (step 341) and accepted as a result of the policy check (step 341) in the base station 125.

As packet traffic (e.g., IP) is typically bursty in nature, the loading situation may change rapidly over a radio link. The radio resource management (RRM) module 296 in the base station 125 is continuously aware of available radio link resources and on the other hand the base station 125 (e.g., control module 295) is able to detect relatively quickly if there is ongoing traffic or not in the currently "active" user service flows. Based on this information the base station 125 is able to adjust scheduling of the transmission opportunities dynamically to the user service flows that really use radio link resources. It should be noted that in one exemplary embodiment, the base station 125 uses the BW Req (see step 320) in order to determine appropriate initial allocation of radio link resources for the UE 120, and then subsequently adjust this allocation. In this exemplary embodiment, if there is no BW Req, the base station 125 typically would not allocate radio link resources for the UE 120. In another exemplary embodiment, the base station 123 would determine appropriate initial allocation of radio link resource in response to the IP datagrams sent in step 340-1, and then subsequently adjust this allocation.

Any changes in the radio link resources provided for a user are, in an exemplary embodiment, indicated in a "Service Indication" message, which is part of the notion of dynamic user service flow release. As the base station 125 is assumed to be capable of monitoring activity of the concurrent user service flows, the base station 125 can determine termination of the user service flows as well.

When the base station 125 detects a reduction in activity (e.g., after an elapsed time period) in a user service flow (step 370), the base station 125 in an exemplary embodiment sends a "Service Indication" message (step 380) to the corresponding user equipment 120 with a resource report (e.g., {Resource Report}) for default or reduced transmission opportunity so that reserved radio link capacity for the particular user equipment 120 can be scheduled immediately to other users. The reduction in activity could be no activity for some (e.g., predetermined) time period or a lessened frequency of activity over the time period.

The "Service Indication" message can be used also to warn the user equipment 120 that the base station 125 is not able to provide enough radio link resources for the current user service flow due to, e.g., network problems, too many user equipments 120, or other reasons.

Figure 4A:
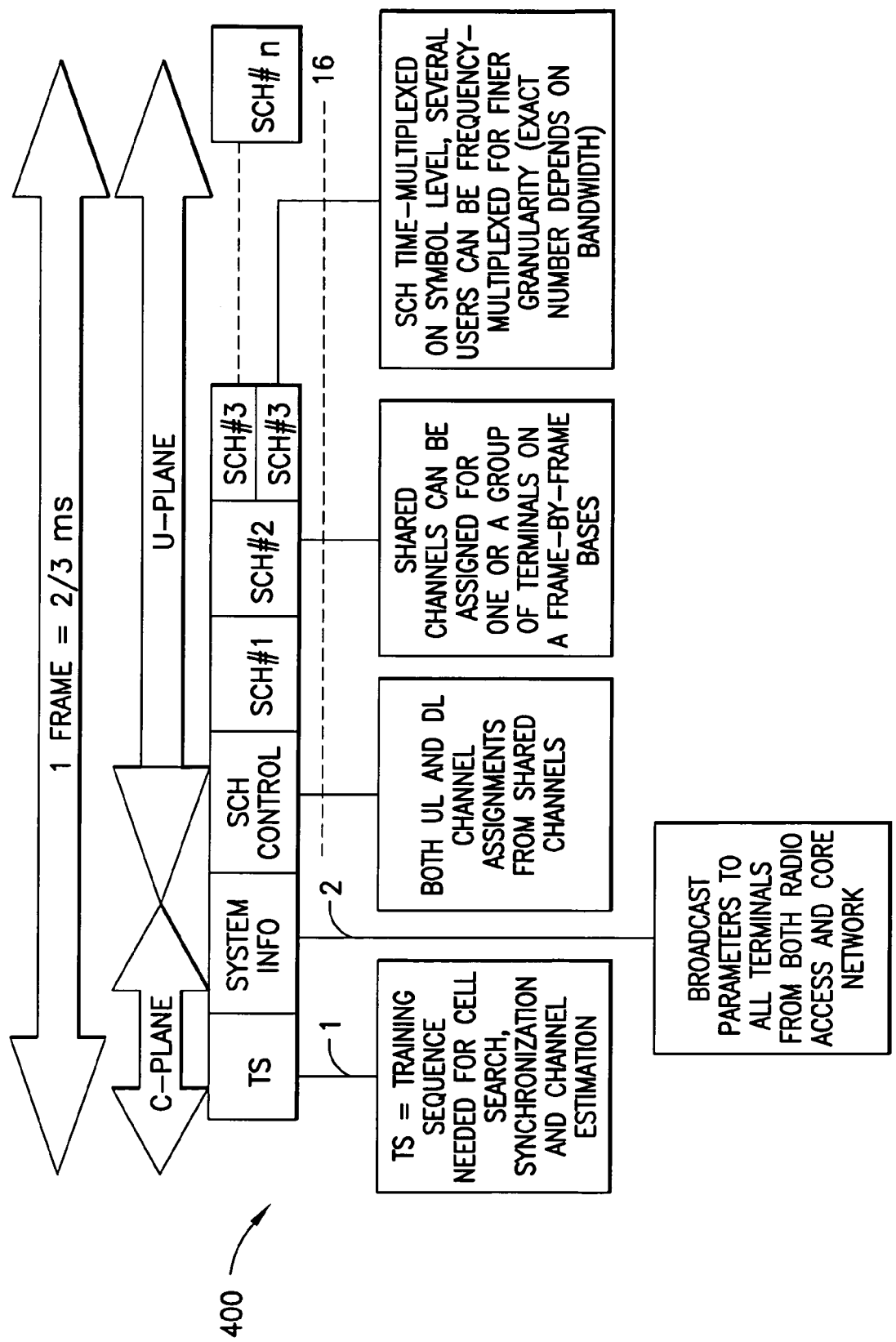
FIG. 4A is a block diagram of an exemplary downlink frame structure, timing, and planes used for the downlink frame.

Turning now to FIG. 4A, an exemplary downlink frame structure is shown. The downlink frame structure 500 takes ⅔ millisecond (ms), and comprises a control plane (c-plane) and user plane (u-plane) portions. The downlink frame structure comprises a training sequence (TS) portion, a system information portion, a shared channel (SCH) control portion, and a number of shared channel portions.

Figures 1, 4B:
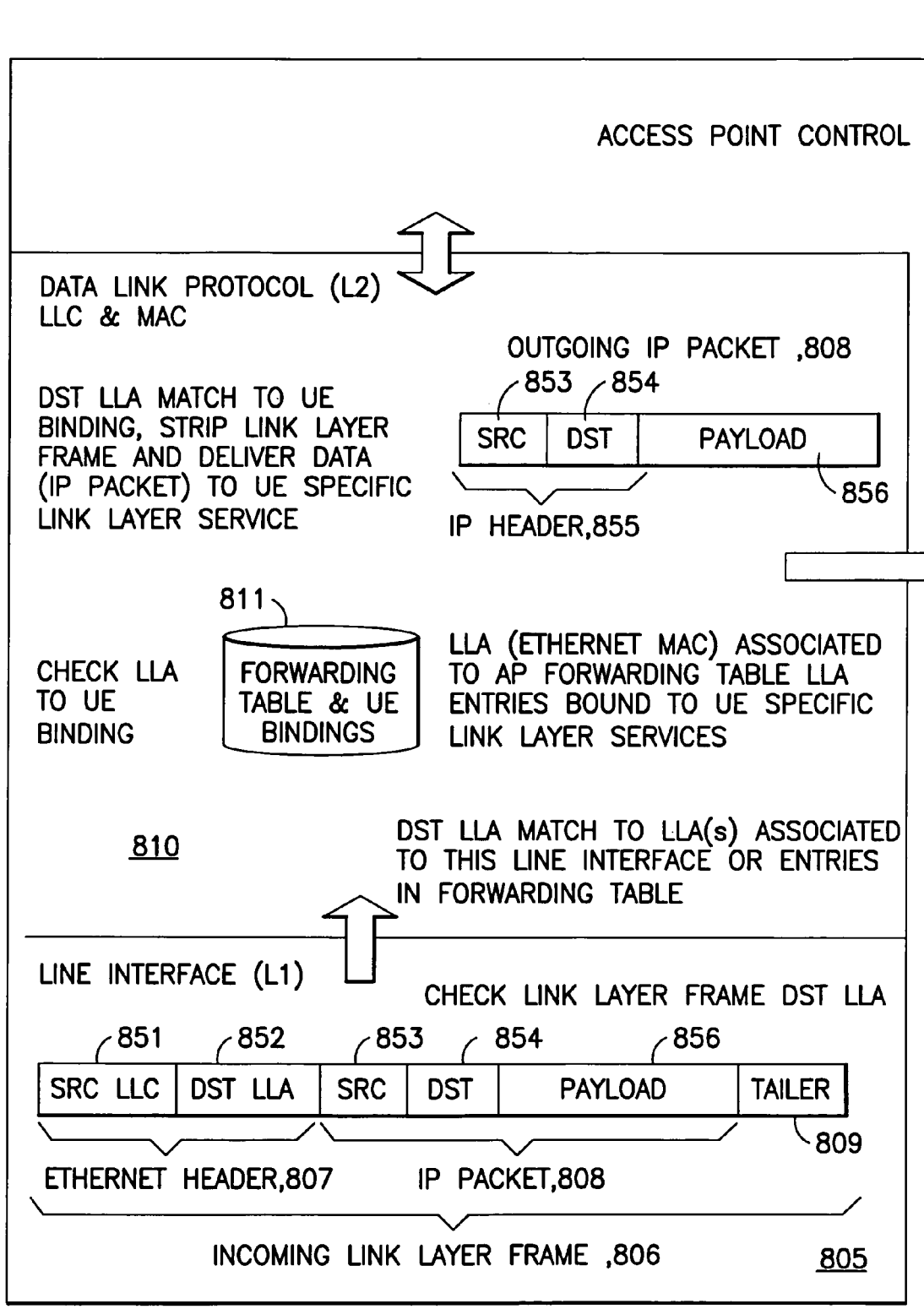
FIG. 4B is a diagram of exemplary downlink packet processing.
Figures 2, 4B:
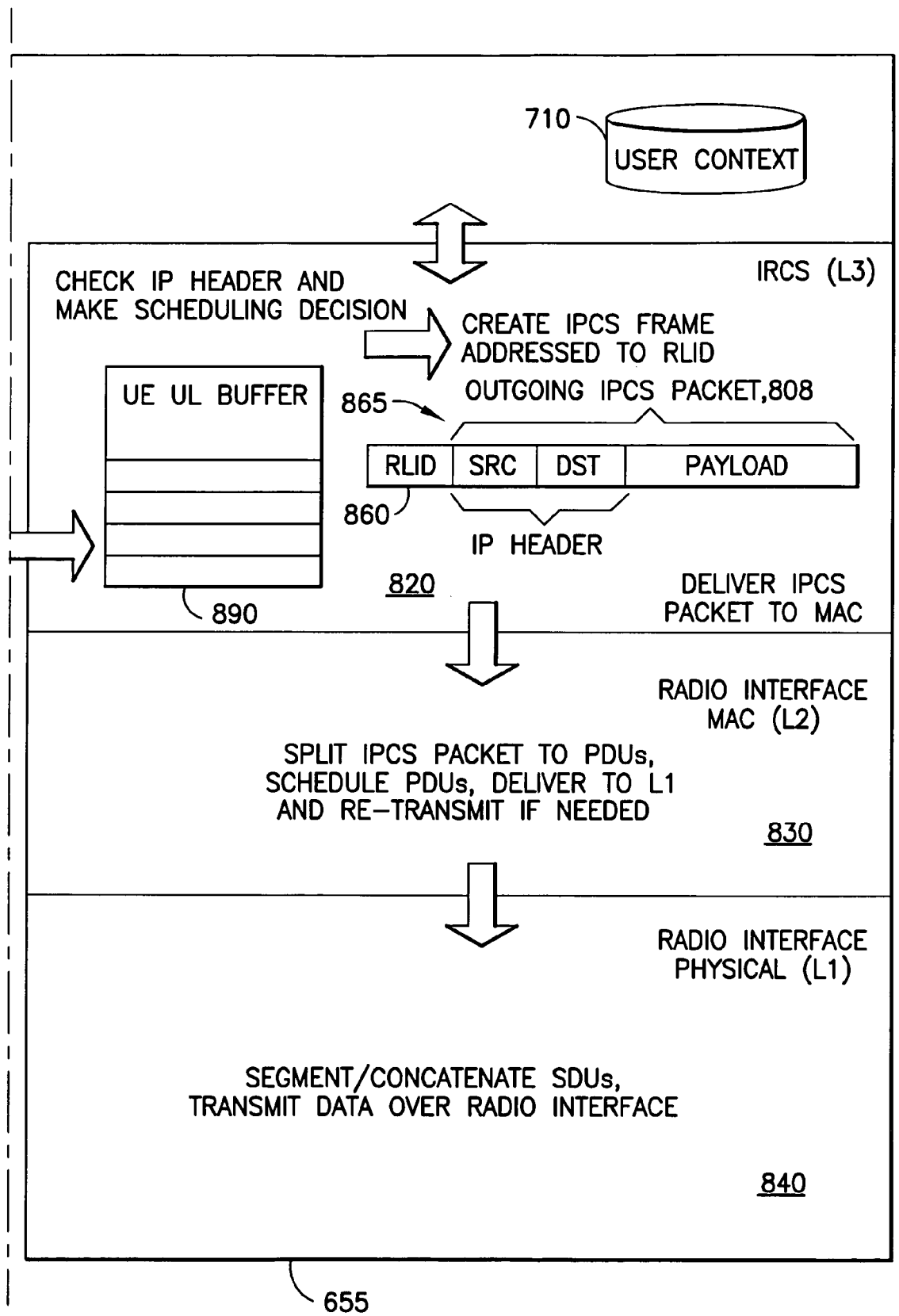

Turning to FIG. 4B with appropriate reference to FIG. 2B, a diagram of exemplary downlink packet processing is shown. In the example of FIG. 4B, access point control module 655 comprises user context 710. In step 805, a line interface (L1) module (e.g., physical module 675 of the AP network interface 720) examines an incoming link layer frame 806, which comprises an Ethernet header 807, an IP packet 808, and a trailer 809. The Ethernet header 807 comprises link level access (LLA) source address 851 and LLA destination address 852. In step 805, the LLA destination address 852 is checked and is forwarded to the data link protocol (L2) module, e.g., the data link layer 665. The data link protocol module could comprise logical link control (LLC) and MAC.

In step 810, the LLA to user equipment (UE) binding is checked using the database 811 and is bound to UE specific link layer services. The outgoing IP packet 808, which comprises the source address 853, destination address 854, and payload 856, is forwarded (e.g., using the relay module 670) to the IPCS module (L3), e.g., the IPCS module 631. The IP packet 808 is placed in the UE downlink (DL) buffer 890. In step 820, the IPCS module removes the IP packet 808 from the UE DL buffer 890, checks the IP header 855 and makes a scheduling decision. The IPCS module creates an IPCS frame addressed to the radio link identification (RLID) 860, which corresponds to a specific user equipment 120. The IPCS frame includes the RLID 860 and an open area (not shown) for the IP packet 808. Once the IP packet 808 is added into the IPCS frame, the IPCS packet 865 is created. The IPCS module uses the user context 710 to determine the RLID 860. The IPCS delivers the IPCS packet 865 to the radio interface MAC module (L2), e.g., the MAC module 636.

In step 840, the radio interface MAC module splits the IPCS packet 865 to a number of packet data units (PDUs) and delivers the PDUs to the radio interface physical (L1) module, e.g., the radio L1 module 641, which segments/concatenates service data units (SDUs) and transmits the SDUs over the radio interface (e.g., downlink communication path 262 on radio link 260).

Figure 5A:
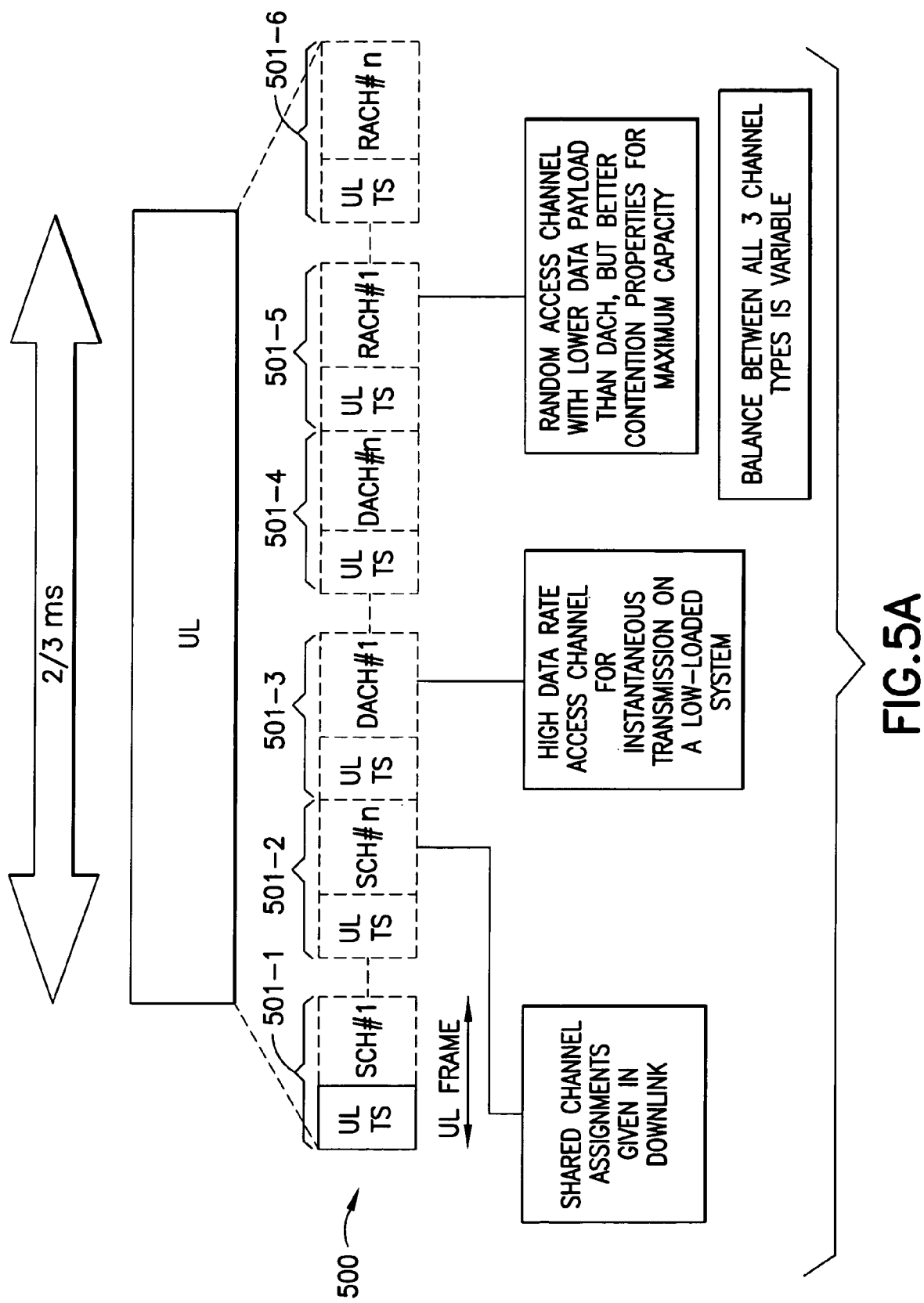
FIG. 5A is a block diagram of an exemplary uplink frame structure and timing.

Referring to FIG. 5A, an exemplary uplink frame structure 500 is shown. The uplink frame structure 500 takes ⅔ ms and comprises an uplink (UL) training sequence (TS) portion, a shared channel portion in a first UL frame 501-1. Other frames 501-2 through 501-6 are also shown comprising shared channel (SCH) assignments given in downlink, high data rate access channels (DACH) for instantaneous transmission on a low-loaded system, and random access channels (RACH) with lower data payload than DACH, but better contention properties for maximum capacity. The balance between all three channel types, SCH, DACH, and RACH, is variable.

Figures 2, 2B:
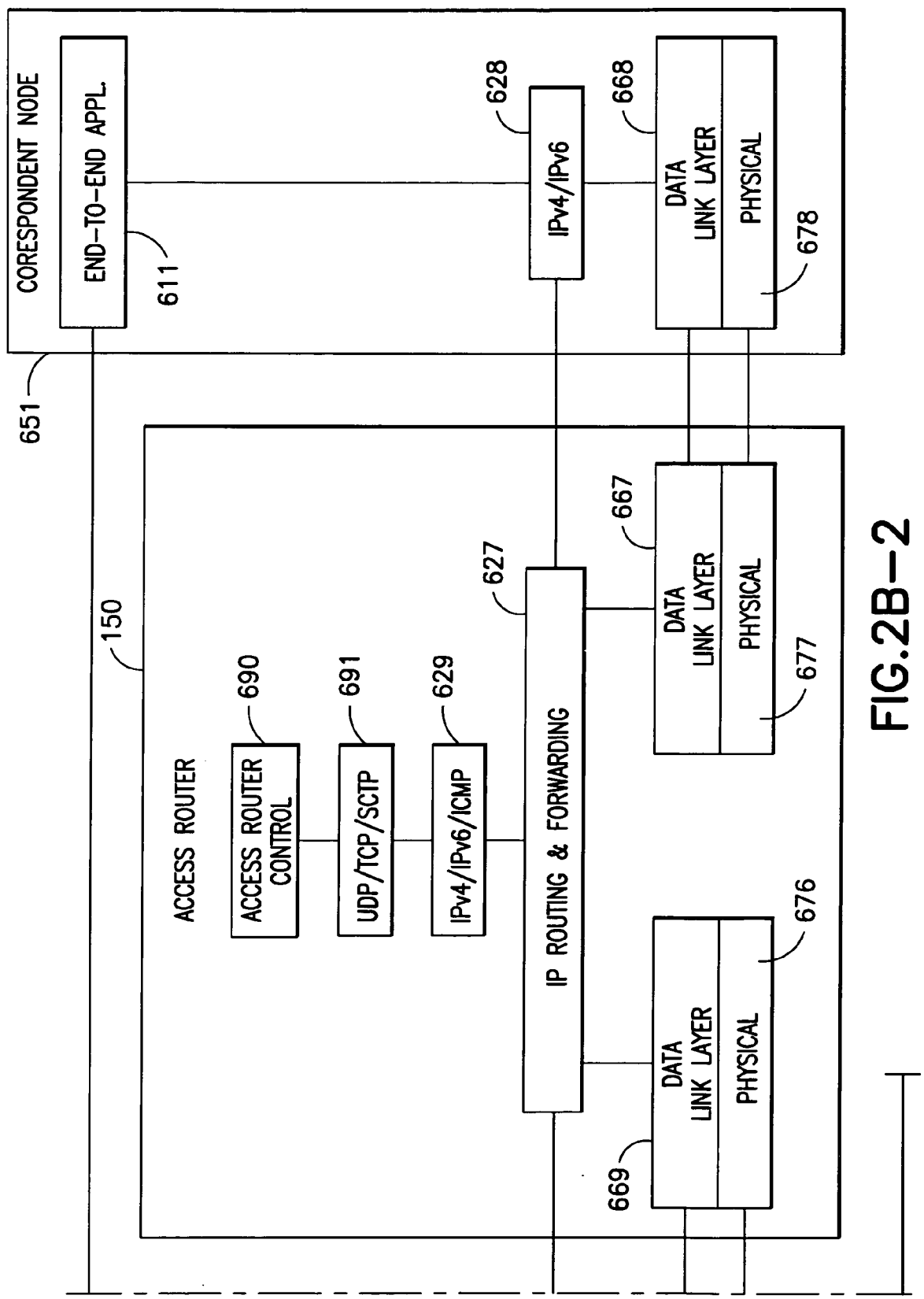
FIG. 2 includes FIGS. 2A and 2B, where
Figures 1, 5B:
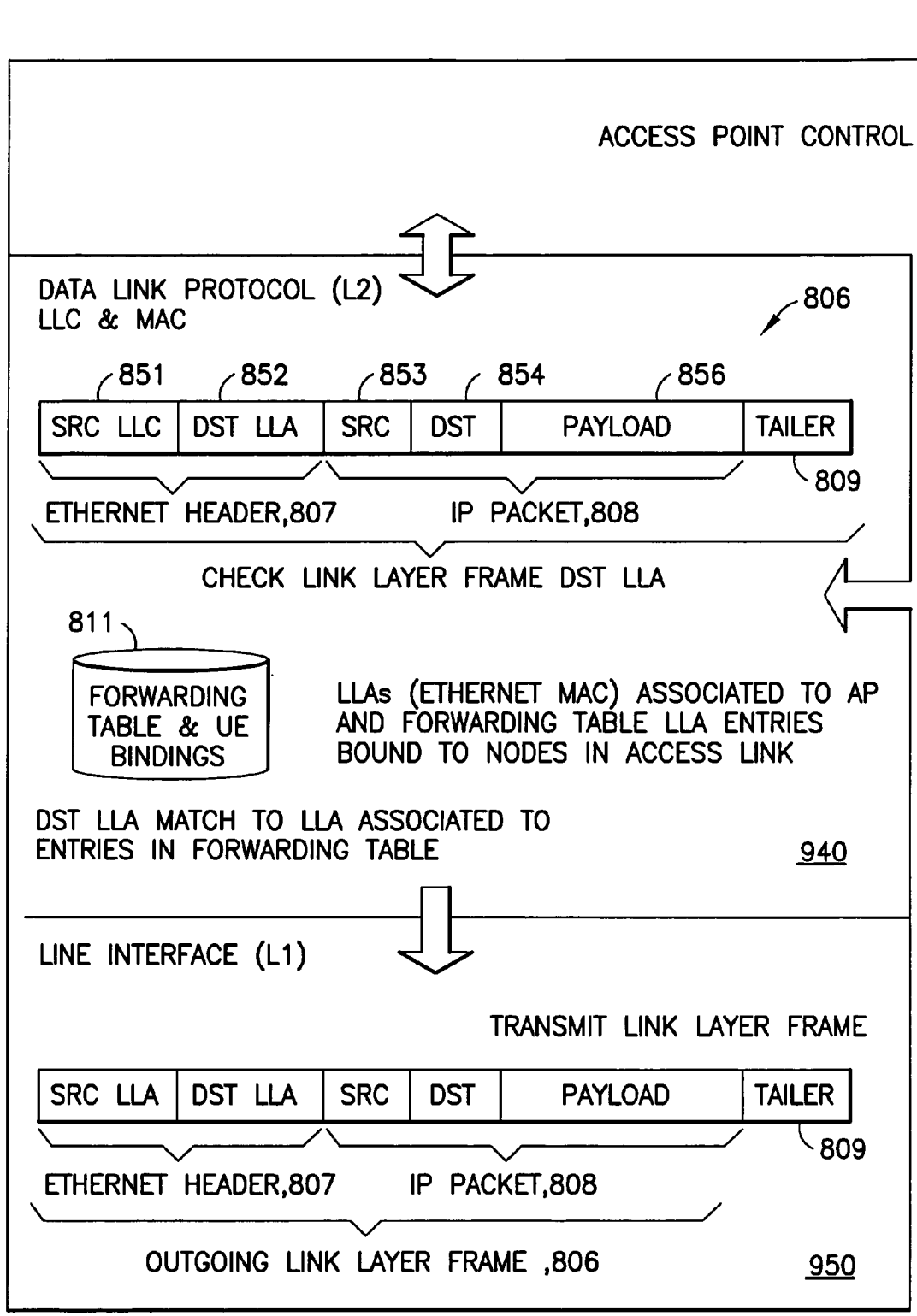
FIG. 5B is a block diagram of exemplary uplink packet processing.
Figures 2, 5B:
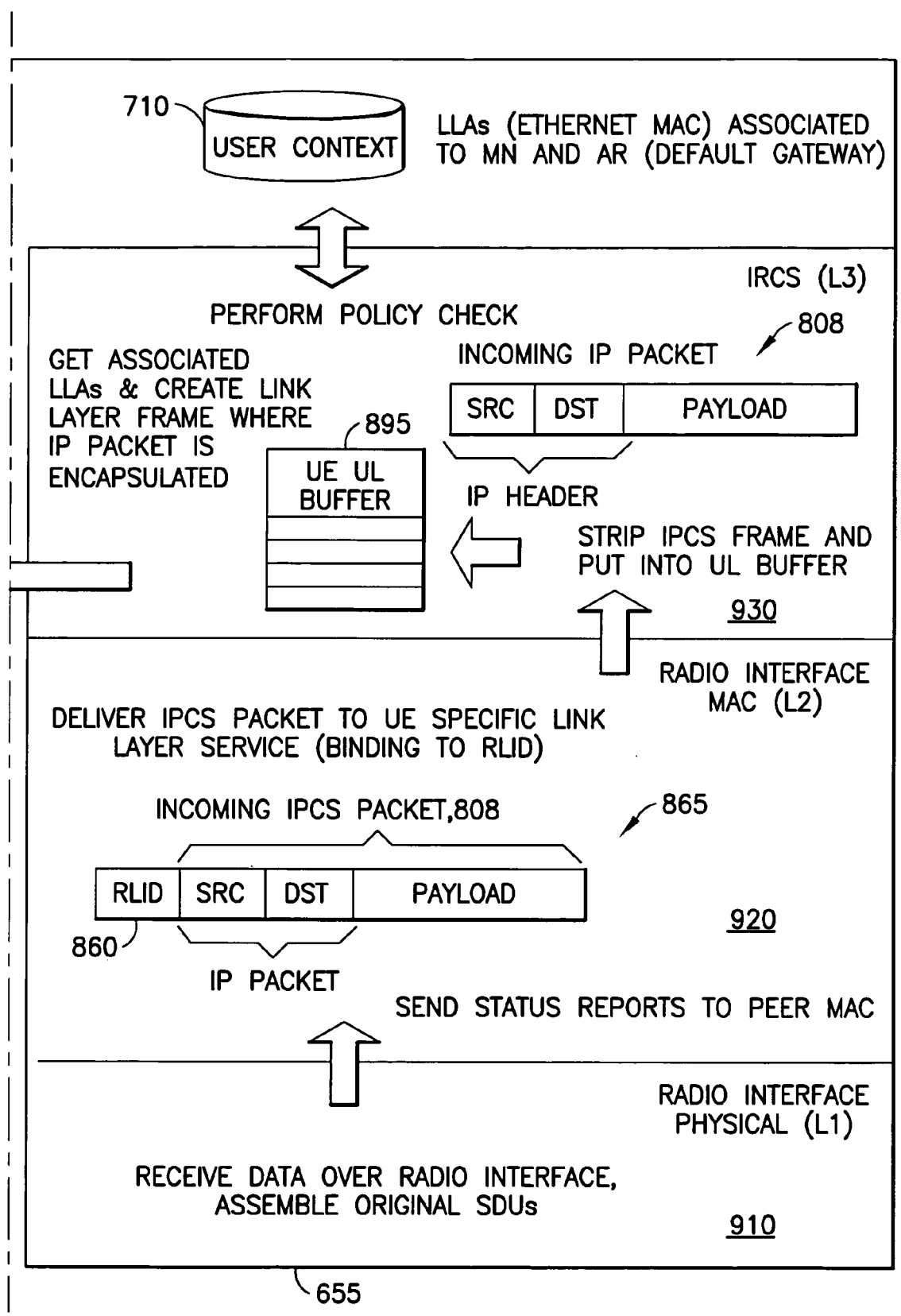

Turning now to FIG. 5B, a block diagram of exemplary uplink packet processing is shown. In step 910, the radio interface physical (L1) module receives data over the radio interface (e.g., uplink communication path 261 on radio link 260) and assembles the SDUs, delivering the SDUs to the radio interface MAC (L2) module. In step 920, the radio interface MAC (L2) module assembles the IPCS packet 865 and delivers the IPCS packet 865 to the UE specific link layer service, binding the RLID 860. The IPCS module receives the IPCS packet 865, strips the IPCS frame (e.g., the RLID 860) from the IPCS packet 865 to create an IP packet, which is stored in the UE uplink (UL) buffer 895. Here the IPCS performs IP lookup for the received IP packet 808 in order to detect user service flow (e.g., user IP flow) and corresponding DSCP marking, makes a policy check (e.g., is the user equipment 120 allowed to use this DSCP marking based on the subscription for the user equipment 120 and network policies of the operator). See, e.g., steps 340-1 and 341 of FIG. 1. Now the RRM function of the base station 125 (e.g., RRM module 296 of FIG. 2) may adjust transmission opportunities at lower radio communication layers accordingly. See, e.g., steps 351, 350, and 360 of FIG. 3.

Also in step 930, the IPCS module gets associate LLAs, using user context 710, and creates a link layer frame 806 where the IP packet 808 is encapsulated. The IPCS module transports (e.g., using the relay module 670) the IP packet 808 to the data link protocol (L2) module. In step 940, the data link protocol module checks the link layer frame destination LLA and uses the database 811 to match the destination LLA to the LLA associated in the database 811. In other words, the data link protocol module "fills in" the source LLA 851 and destination LLA 852.

In step 940, the data link protocol module forwards the filled in link layer frame 806 to the line interface (L1) module, which transmits the link layer frame in step 950.

Examples of this invention thus pertain to methods, computer programs and apparatus to control access by user equipments 120 to a shared radio link traffic channel 263 used for uplink of packet traffic from a user equipment 120 to a base station 125. Access may be controlled by providing transmission opportunities to the user equipments 120 and such transmission opportunities may be adjusted using, for example, QoS techniques. For instance, the base station 125 has the capability to learn the uplink QoS from the first transmitted IP packet (e.g., or another of the transmitted IP packets) from the user equipment 120 and apply this information in allocating radio link resources for the uplink. As another example, the base station 125 may also use higher layer information from the IP packet, e.g., real-time transport protocol (RTP) or hypertext transport protocol (HTTP) in order to determine what traffic profile could be applied for providing proper QoS for this user service flow.

It should be noted that the various steps of the signalling flow diagram of FIG. 3 may represent program steps, or interconnected circuits, blocks and functions, or a combination of program steps and circuits, blocks and functions for performing the specified tasks. The embodiments of the disclosed invention may also be implemented on a signal bearing medium containing machine readable instructions executable by a data processor to perform operations described herein.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. For instance, first-come, first-served techniques could be used instead of QoS when controlling uplink transmission opportunities for user equipments 120. Nonetheless, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A method comprising:
   receiving on an uplink communication path a first internet protocol (IP) packet from a user equipment, the first IP packet being a first IP datagram of a user service flow;
   responsive to the reception, determining an unlink quality of service for the user service flow and, in accordance with the determined quality of service, radio link resources to be allocated on the uplink communication path for the user equipment, the determination based at least in part on an information content of the first IP packet of the user service flow; and
   allocating the determined radio link resources on the uplink communication path for the user equipment.

2. The method of claim 1, wherein:
   the radio link resources comprise bandwidth;
   determining further comprises determining bandwidth to be allocated on the uplink communication path for the user equipment; and
   allocating further comprises allocating the determined bandwidth on the uplink communication path for the user equipment.

3. The method of claim 1, wherein:
   allocating further comprises scheduling transmission opportunities for the user equipment on the uplink communication path; and
   the method further comprises communicating to the user equipment on a downlink communication path an indication of the scheduled transmission opportunities for the user equipment.

4. The method of claim 3, wherein:
   the method further comprises, prior to receiving, communicating to the user equipment on the downlink communication path an indication of bandwidth availability for at least the user equipment; and
   communicating to the user equipment on the downlink communication path an indication of the scheduled transmission opportunities for the user equipment further comprises communicating an indication of an increase or no increase, relative to the communicated bandwidth availability, of the scheduled transmission opportunities for the user equipment.

5. The method of claim 4, wherein communicating an indication of bandwidth availability for at least the user equipment further comprises communicating an indication of bandwidth availability for a cell.

6. The method of claim 3, wherein scheduling further comprises adjusting the scheduled transmission opportunities based at least on activity of the user equipment on the uplink communication path, the activity determined at least in part by packet transmissions per a time period on the uplink communication path.

7. The method of claim 6, wherein scheduling further comprises adjusting the scheduled transmission opportunities based at least on the activity of the user equipment on the uplink communication path and on bandwidth determined to be needed for the activity of the user equipment on the uplink communication path.

8. A method comprising:
receiving on an uplink communication path at least one packet from a user equipment;
responsive to the reception. determining radio link resources to be allocated on the uplink communication path for the user equipment, the determination based at least in part on an information content of the at least one packet; and
allocating the determined radio link resources on the uplink communication path for the user equipment; where
the information content comprises a code; and
determining radio link resources to be allocated on the uplink communication path for the user equipment further comprises:
determining a quality of service corresponding to the code; and
based on the quality of service, determining radio link resources to be allocated on the uplink communication path for the user equipment.

9. The method of claim 1, wherein the information content comprises a differentiated services code point (DSCP) code.

10. A method comprising:
receiving on an uplink communication path at least one packet from a user equipment;
responsive to the reception, determining radio link resources to be allocated on the uplink communication path for the user equipment, the determination based at least in part on an information content of the at least one packet; and
allocating the determined radio link resources on the uplink communication path for the user equipment; where
the information content comprises information indicating by which one of a plurality of predetermined transport protocols the at least one packet is formatted; and
determining radio link resources to be allocated on the uplink communication path for the user equipment further comprises determining based at least on the one predetermined transport protocol the radio link resources to be allocated on the uplink communication path for the user equipment.

11. The method of claim 10, wherein the plurality of predetermined transport protocols comprise at least two of real-time transport protocol (RTP), trivial file transfer protocol (TFTP), file transport protocol (FTP), or hypertext transport protocol (HTTP).

12. The method of claim 10, wherein determining based at least on the one predetermined transport protocol the radio link resources to be allocated on the uplink communication path for the user equipment further comprises:
determining a traffic profile corresponding to the one predetermined transport protocol; and
determining from the traffic profile the radio link resources to be allocated on the uplink communication path for the user equipment.

13. The method of claim 1, wherein the method further comprises:
determining a reduction of activity in a user service flow for the user equipment, the user service flow comprising the at least one packet and at least one additional packet;
changing the determined radio link resources to reduced radio link resources; and
communicating to the user equipment on a downlink communication path an indication of the reduced radio link resources allocated for the user equipment.

14. A method comprising:
receiving on an uplink communication path at least one packet from a user equipment;
responsive to the reception, determining radio link resources to be allocated on the uplink communication path for the user equipment, the determination based at least in part on an information content of the at least one packet; and
allocating the determined radio link resources on the uplink communication path for the user equipment; where
determining radio link resources to be allocated is performed each time a packet is received from the user equipment and wherein allocating the determined radio link resources is performed when needed in response to a determination of radio link resources that modifies a current allocation of radio link resources.

15. The method of claim 14, wherein the at least one packet is part of a user service flow comprising the at least one packet, wherein the at least one packet is formatted in accordance with an internet protocol (IP), and wherein determining radio link resources to be allocated further comprises:
associating a tuple determined using the at least one packet with the user service flow; and
marking the user service flow as active in response to the reception of the at least one packet.

16. The method of claim 15, wherein there is a plurality of user service flows, each user service flow comprising at least one packet, and wherein determining radio link resources and allocating use tuples associated with the user service flows in order to distinguish between the user service flows.

17. The method of claim 16, wherein each tuple comprises a source IP address, a destination IP Address, a transport protocol, a source port, and a destination port.

18. A method comprising:
receiving on an uplink communication path at least one packet from a user equipment;
responsive to the reception, determining radio link resources to be allocated on the uplink communication path for the user equipment. the determination based at least in part on an information content of the at least one packet; and
allocating the determined radio link resources on the uplink communication path for the user equipment; where
the method further comprises:
receiving a bandwidth request from the user equipment, the bandwidth request based at least in part on an amount of information in a buffer of the user equipment, the information to be communicated from the user equipment on the uplink communication path;
responsive to the reception of the bandwidth request, determining based at least in part on the bandwidth request initial radio link resources to be allocated on the uplink communication path for the user equipment;

allocating the determined initial radio link resources; and communicating an indication of the initial radio link resources to the user equipment; and determining radio link resources to be allocated on the uplink communication path for the user equipment further comprises adjusting the initial radio link resources based at least in part on the information content of the at least one packet.

19. A method comprising:

receiving on an uplink communication path at least one packet from a user equipment;

responsive to the reception, determining radio link resources to be allocated on the uplink communication path for the user equipment, the determination based at least in part on an information content of the at least one packet; and allocating the determined radio link resources on the uplink communication path for the user equipment; the method further comprising transmitting on a downlink communication path from a network access element to the user equipment an indication of radio link resources allocated on the uplink communication path for the user equipment;

receiving at the user equipment from the downlink communication path the indication of radio link resources allocated on the uplink communication path for the user equipment; and communicating so as to meet the indicated radio link resources at least one additional packet on the uplink communication path.

20. The method of claim 19, wherein communicating so as to meet the indicated radio link resources further comprises performing at least one of delaying sending packets, sending infrequent packets, or not starting an application requiring packets to be sent.

21. An apparatus comprising circuitry configured to receive on an uplink communication path a first internet protocol (IP) packet from a user equipment the first IP packet being a first IP datagram of a user service flow, the circuitry configured, responsive to the reception, to determine an uplink quality of service for the user service flow and, in accordance with the determined quality of service, radio link resources to be allocated on the up link communication path for the user equipment, the determination based at least in part on an information content of the first IP packet of the user service flow; and the circuitry configured to allocate the determined radio link resources on the uplink communication path for the user equipment.

22. The apparatus of claim 21, wherein:

the radio link resources comprise bandwidth;

the circuitry is further configured when determining to determine bandwidth to be allocated on the uplink communication path for the user equipment; and the circuitry is further configured when allocating to allocate the determined bandwidth on the uplink communication path for the user equipment.

23. The apparatus of claim 21, wherein:

the circuitry is further configured when allocating to schedule transmission opportunities for the user equipment on the uplink communication path; and the circuitry is further configured to communicate to the user equipment on a downlink communication path an indication of the scheduled transmission opportunities for the user equipment.

24. The apparatus of claim 21, wherein:

the information content comprises a code; and the circuitry is further configured when determining radio link resources to be allocated on the uplink communication path for the user equipment to determine a quality of service corresponding to the code, and, based on the quality of service, to determine radio link resources to be allocated on the uplink communication path for the user equipment.

25. The apparatus of claim 21, wherein:

the information content comprises information indicating by which one of a plurality of predetermined transport protocols the at least one packet is formatted; and the circuitry is further configured when determining radio link resources to be allocated on the uplink communication path for the user equipment to determine based at least on the one predetermined transport protocol the radio link resources to be allocated on the uplink communication path for the user equipment.

26. The apparatus of claim 21, wherein the circuitry is further configured to determine a reduction of activity in a user service flow for the user equipment, the user service flow comprising the at least one packet and at least one additional packet, to change the determined radio link resources to reduced radio link resources, and to communicate to the user equipment on a downlink communication path an indication of the reduced radio link resources allocated for the user equipment.

27. The apparatus of claim 21, wherein the circuitry is further configured to determine radio link resources to be allocated each time a packet is received from the user equipment and the circuitry is further configured to allocate the determined radio link resources when needed in response to a determination of radio link resources that modifies a current allocation of radio link resources.

28. The apparatus of claim 21, wherein the circuitry is further configured to receive a bandwidth request from the user equipment, the bandwidth request based at least in part on an amount of information in a buffer of the user equipment, the information to be communicated from the user equipment on the uplink communication path, the circuitry is further configured, responsive to the reception of the bandwidth request, to determine based at least in part on the bandwidth request initial radio link resources to be allocated on the uplink communication path for the user equipment, the circuitry is also configured to allocate the determined initial radio link resources and to communicate an indication of the initial radio link resources to the user equipment, and the circuitry is further configured, when determining radio link resources to be allocated on the uplink communication path for the user equipment, to adjust the initial radio link resources based at least in part on the information content of the at least one packet.

29. The apparatus of claim 21, wherein the user equipment does not support radio bearer related control.

30. A signal bearing storage medium tangibly embodying a program of machine-readable instructions executable by at least one processor to perform operations comprising:

receiving on an up link communication path a first internet protocol (IP) packet from a user equipment, the first IP packet being a first IP datagram of a user service flow;

responsive to the reception, determining an up link quality of service for the user service flow and, in accordance with the determined quality of service, radio link resources to be allocated on the uplink communication path for the user equipment, the determination based at least in part on an information content of the first IP packet of the user service flow; and allocating the determined radio link resources on the uplink communication path for the user equipment.

31. The signal bearing storage medium of claim 30, wherein:

the information content comprises a code; and determining radio link resources to be allocated on the uplink communication path for the user equipment further comprises:

determining a quality of service corresponding to the code; and based on the quality of service, determining radio link resources to be allocated on the uplink communication path for the user equipment.

32. The signal bearing storage medium of claim 30, wherein:

the information content comprises information indicating by which one of a plurality of predetermined transport protocols the at least one packet is formatted; and determining radio link resources to be allocated on the uplink communication path for the user equipment further comprises determining based at least on the one predetermined transport protocol the radio link resources to be allocated on the uplink communication path for the user equipment.

33. The signal bearing storage medium of claim 30, wherein:

the operations further comprise:

receiving a bandwidth request from the user equipment, the bandwidth request based at least in part on an amount of information in a buffer of the user equipment, the information to be communicated from the user equipment on the uplink communication path;

responsive to the reception of the bandwidth request, determining based at least in part on the bandwidth request initial radio link resources to be allocated on the uplink communication path for the user equipment;

allocating the determined initial radio link resources; and communicating an indication of the initial radio link resources to the user equipment; and determining radio link resources to be allocated on the uplink communication path for the user equipment further comprises adjusting the initial radio link resources based at least in part on the information content of the at least one packet.

34. An apparatus comprising:

means for receiving on an uplink communication path at least one packet from a user equipment;

means, responsive to the reception, for determining radio link resources to be allocated on the uplink communication path for the user equipment, the determination based at least in part on an information content of the at least one packet; and means for allocating the determined radio link resources on the uplink communication path for the user equipment, where said receiving means is further configured to receive a bandwidth request from the user equipment, the bandwidth request based at least in part on an amount of information in a buffer of the user equipment, the information to be communicated from the user equipment on the uplink communication path, and said determining means is further configured, responsive to the reception of the bandwidth request, to determine based at least in part on the bandwidth request initial radio link resources to be allocated on the uplink communication oath for the user equipment, and where said allocating means is further configured to allocate the determined initial radio link resources and to communicate an indication of the initial radio link resources to the user equipment, said determining means further configured, when determining radio link resources to be allocated on the uplink communication path for the user equipment, to adjust the initial radio link resources based at least in part on the information content of the at least one packet.

35. The apparatus of claim 34, wherein:

the information content comprises a code; and the means for determining radio link resources to be allocated on the uplink communication path for the user equipment further comprises:

means for determining a quality of service corresponding to the code; and means responsive to the quality of service for determining radio link resources to be allocated on the uplink communication path for the user equipment.

36. The apparatus of claim 34, wherein:

the information content comprises information indicating by which one of a plurality of predetermined transport protocols the at least one packet is formatted; and the means for determining radio link resources to be allocated on the uplink communication path for the user equipment further comprises means for determining based at least on the one predetermined transport protocol the radio link resources to be allocated on the uplink communication path for the user equipment.

37. The apparatus of claim 34, wherein the uplink communication path comprises a shared radio link traffic channel, the at least one packet is received from the shared radio link traffic channel, and the allocated determined radio link resources are allocated for the shared radio link traffic channel.

38. A method comprising:

receiving at a network access element on a first uplink communication path a bandwidth request from a user equipment, the bandwidth request for a second uplink communication path used for packet traffic from the user equipment to the network access element;

responsive to the reception, determining radio link resources to be allocated on the second uplink communication path for the user equipment, the determination based at least in part on the bandwidth request; and allocating the determined radio link resources on the second uplink communication path for the user equipment, further comprising:

receiving at the network access element a plurality of packets on the second uplink communication path;

determining an inactivity in reception of packets from the user equipment;

adjusting the radio link resources based at least in part on the inactivity; and communicating an indication of the adjusted radio link resources to the user equipment.

39. The method of claim 38, wherein communication on the first uplink communication path uses radio resource control (RRC) protocol.

40. The method of claim 38, wherein the bandwidth request is based at least in part by an amount of information in a buffer of the user equipment, the information to be transmitted by the user equipment using the second uplink communication path.

41. The method of claim 40, wherein the amount of information is based on a number of packets in the buffer.

42. The method of claim 40, wherein the amount of information is based on a number of packets placed in the buffer during a predetermined time period.

43. The method of claim 38, further comprising communicating a bandwidth report on a downlink communication path from the network access element to the user equipment.

44. The method of claim 43, wherein communication on the downlink communication path uses radio resource control (RRC) protocol.

* * * * *